Figure 1:
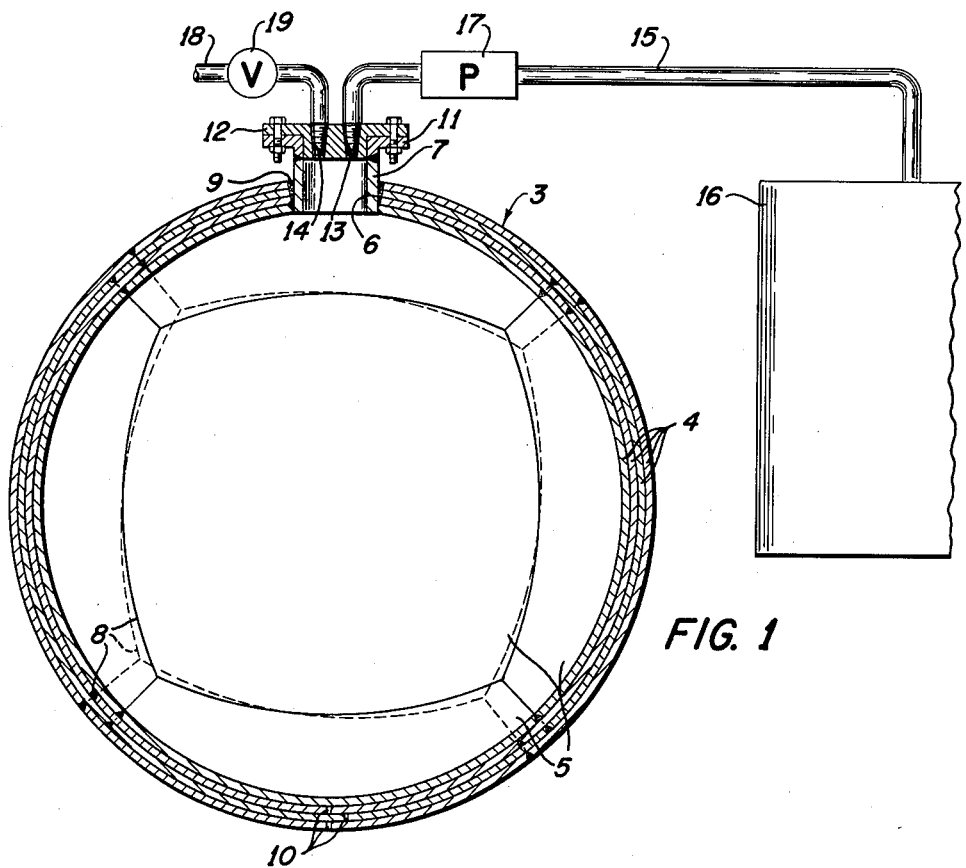

July 31, 1962 F. A. CARSTENS 3,046,647
METHOD OF FABRICATING HEMISPHERICAL MULTI-LAYER HEADS
Filed March 3, 1959

INVENTOR.
FRED A. CARSTENS
BY
*Andrus & Starke*
Attorneys

United States Patent Office 3,046,647
Patented July 31, 1962

3,046,647
METHOD OF FABRICATING HEMISPHERICAL MULTI-LAYER HEADS
Fred A. Carstens, Milwaukee, Wis., assignor to A. O. Smith Corporation, Milwaukee, Wis., a corporation of New York
Filed Mar. 3, 1959, Ser. No. 796,964
4 Claims. (Cl. 29—421)

This invention relates to a method of fabricating hemispherical multi-layer heads for vessels adapted to contain fluids or gases under high pressure.

Several methods have been successfully employed for making multi-layer heads. For one reason or another these methods are generally not suited for the heads of large vessels, especially where the diameter exceeds approximately nine feet. While the method of this invention is applicable to heads of smaller size, it is particularly adapted to the fabrication of heads for vessels where the diameter exceeds nine feet.

According to this invention, a spherical shell is first fabricated having a number of steel laminations in accordance with the wall thickness desired. The spherical shell is then subjected to internal pressure adequate to stretch the steel in the various layers beyond the elastic limit as determined by a measurable set in the outer layer to provide the shell with true sphericity combined with tightness of the layers. The spherical shell is then cut on an equator line to provide a pair of matched heads of uniform wall thickness.

The drawings furnished herewith illustrate the best mode of carrying out the invention as presently contemplated and set forth hereinafter.

Figure 2:
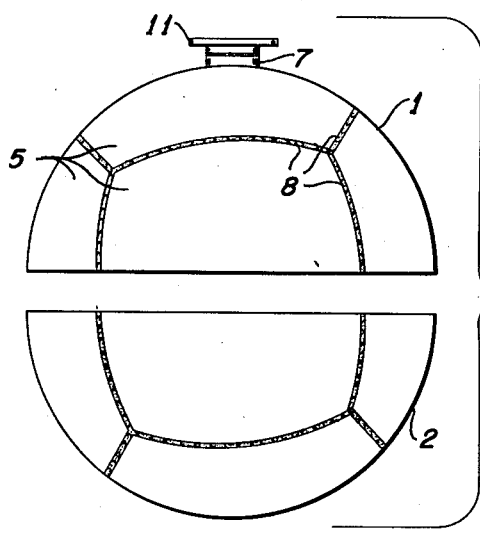

In the drawings:

FIGURE 1 is a sectional view of a laminated spherical shell provided with pressurizing equipment for attaining tightness between the layers and true sphericity; and FIGURE 2 is a side elevation showing the shell of FIGURE 1 cut on an equator line to provide a pair of matched heads of uniform wall thickness.

Referring to the drawings, multi-layer hemispherical heads 1 and 2 are to be provided for a vessel, not shown, having a multi-layer cylindrical shell section.

In accordance with the method of the invention, a spherical shell 3 is initially fabricated having a number of concentric layers 4 built up to provide a predetermined wall thickness. As illustrated in the embodiment shown in the drawings, each layer is formed of a plurality of carbon steel plate sections 5 which are cold formed in a dishing operation to provide the desired shell contour and then welded together. While each layer 4 shown in the drawings is made up of six equal plate sections 5, any number of readily formable sections may be utilized to complete a given layer. If desired, the sections 5 forming the inner layer may be alloy clad to better withstand any corrosive condition to which the heads may be subjected.

In the fabrication of the innermost layer 4, the plate sections 5 are cut to proper size, dished to the desired shell contour, and edge scarfed for welding. One of the plate sections 5 is provided with a manway opening 6 and an unflanged manway neck 7 is welded within the opening to provide access to the inside of the shell. The plates 5 are then assembled and secured together by welds 8 along the edges of adjacent plates. The inner layer may then be stress relieved or heat treated if metallurgically required, and thereafter hydrostatically tested.

In the subsequent layers 4, the plate sections 5 are similarly prepared for assembly and welding as the innermost layer. In succeeding layers the plate sections 5 increase in size, if the same number are utilized as in the innermost layer, and the curvature of the sections is varied to correspond to the outside diameter of the next preceding layer. One section 5 in each layer 4 is provided with an opening 6 to receive the manway neck 7. The succeeding layers may be individually secured by welding to the manway neck as the spherical shell is built up, or several or all the layers may be secured at one time to the manway neck to form the annular weld 9.

Vents 10 are distributed throughout the outer layers and provide means for detecting possible leaks that may occur in the innermost layer. Such vents 10 further provide for the release of air from between the layers so that adjacent layers may be brought into full contact during pressure applications.

During assembly for welding the plate sections 5 for each layer may be rotated relative to the plate sections of the layer therebeneath in order to place the welds 8 in staggered relation as shown in FIGURE 1. The welds 8 should be flush with their corresponding plate sections so as to provide a smooth surface for assembly of the succeeding layer of the shell. If desired, precautions may be taken to prevent attachment between welds 8 and the layer therebeneath.

After the assembly of shell 3 is otherwise complete, a flange section 11 is welded to the manway neck 7.

Further, according to this invention, pressure is applied to the interior of the vessel to effect expansion of the layers. As illustrated in the embodiment shown in the drawings, a test cover 12 is secured to the manway flange 11 and includes an inlet 13 and an outlet 14. A pressure line 15 connects the inlet 13 to a source 16 of relatively incompressible fluid, such as water or a light oil. The pressure fluid is forced into the vessel shell 3 by means of a pump 17 provided in the pressure line 15.

An exhaust line 18 is provided in the outlet 14 and provides for the escape of air from the shell 3 as the pressure fluid enters. After the vessel is filled with the pressure fluid and all the air has been expelled therefrom, the valve 19 in line 18 is closed.

After closure of valve 19, more pressure fluid is forced into the vessel shell 3 to attain a pressure calculated to provide expansion of and a measurable permanent set in the outermost layer of the shell as may be determined by strain gauges or the like. The measurable expansion and permanent set in the outermost layer indicates that the inner layers have also been expanded beyond the elastic limit of the steel, and upon removal of the pressure, the elastic return of the several layers will be substantially equal to maintain the layers in substantially uniform tight contact throughout. In addition to providing tightness between the layers, the internal expansion forces the several layers to assume a true spherical shape which, in the resultant heads 1 and 2, assures a more uniform pressure distribution.

After completion of the expansion or sizing operation, the spherical shell 3 is gas cut or otherwise severed on a diameter or equator line to provide a pair of matched multi-layer hemispherical heads 1 and 2 of uniform wall thickness. Such heads are particularly adapted for use on a multi-layer cylindrical shell, not shown, to provide a vessel, not shown, which is of multi-layer construction throughout.

Various modes of carrying out the invention are contemplated as being within the scope of the following claims particularly pointing out and distinctly claiming the subject matter which is regarded as the invention.

I claim:

1. In a method of fabricating hemispherical multi-layer heads, the steps of forming a multi-layer spherical shell structure wherein each layer is generally in contact with the next adjacent layer or layers, subjecting said shell structure to internal pressure with a relatively incompressible fluid until a discernable permanent set has occurred in the outermost layer of the structure to provide tightness between the layers and a true spherical shape, and severing said shell structure on a diameter line to provide a pair of matched hemispherical multi-layer heads.

2. In a method of fabricating hemispherical multi-layer heads, the steps of forming a hollow spherical inner member, forming on said inner member at least one outer concentric layer to provide a spherical multi-layer shell structure of desired wall thickness, applying pressure internally of the shell structure to impart a permanent set in the outer layer and thereby provide tightness between the layers and a true spherical shape, and severing said shell structure on a diameter line to provide a pair of matched hemispherical multi-layer heads.

3. In a method of fabricating hemispherical multi-layer heads, the steps of forming a hollow spherical inner layer member, forming on said inner layer member a plurality of concentric outer layers to provide a spherical multi-layer shell structure of desired wall thickness, subjecting said shell structure to pressure internally with a relatively incompressible fluid to expand the respective layers beyond their elastic limit and impart a permanent set in the layers and thereby effect a substantially tight contact between the layers and true sphericity in said structure, and severing said shell structure on a diameter line to provide a pair of matched hemispherical multi-layer heads.

4. In a method of fabricating hemispherical multi-layer heads, the steps of providing a plurality of plate sections of substantially equal size, dishing said plate sections to a given curvature, disposing the dished plate sections in edge to edge relation, and welding the same together to form a hollow spherical inner member, forming on said inner member at least one outer concentric layer from a plurality of dished plate sections of substantially equal size to provide a spherical multi-layer shell structure of desired wall thickness, applying pressure internally of the shell structure until a desirable permanent set has occurred in the outermost layer of the structure to provide tightness between the layers and a true spherical shape, and severing said shell structure on a diameter line to provide a pair of matched hemispherical multi-layer heads.

References Cited in the file of this patent

UNITED STATES PATENTS

| | | |
|---|---|---|
| 1,929,118 | Stresau | Sept. 5, 1933 |
| 2,337,247 | Kepler | Dec. 21, 1943 |
| 2,359,446 | Schudder | Oct. 3, 1944 |
| 2,372,723 | Jasper | Apr. 3, 1945 |
| 2,503,191 | Branson | Apr. 4, 1950 |
| 2,715,377 | Gary | Aug. 16, 1955 |